United States Patent
Augstein et al.

(10) Patent No.: US 7,610,758 B2
(45) Date of Patent: Nov. 3, 2009

(54) SUPERCHARGED INTERNAL COMBUSTION ENGINE

(75) Inventors: Joachim Augstein, Steinheim/Murr (DE); Frank Hangs, Winterbach (DE); Arkadi Kudashev, Berlin (DE); Christian Pies, Stuttgart (DE)

(73) Assignee: Daimler AG, Stuttgart (DE)

( * ) Notice: Subject to any disclaimer, the term of this patent is extended or adjusted under 35 U.S.C. 154(b) by 244 days.

(21) Appl. No.: 11/801,413

(22) Filed: May 9, 2007

(65) Prior Publication Data

US 2007/0283938 A1    Dec. 13, 2007

Related U.S. Application Data

(63) Continuation-in-part of application No. PCT/EP2005/011914, filed on Nov. 8, 2005.

(30) Foreign Application Priority Data

Nov. 12, 2004 (DE) ...................... 10 2004 054 726

(51) Int. Cl.
| | |
|---|---|
| F02B 33/44 | (2006.01) |
| F02B 37/00 | (2006.01) |
| F02B 37/02 | (2006.01) |
| F02B 37/04 | (2006.01) |
| F02B 37/12 | (2006.01) |
| F02B 37/18 | (2006.01) |
| F02B 33/10 | (2006.01) |
| F01N 7/10 | (2006.01) |

(52) U.S. Cl. ............................ 60/612; 60/323; 123/562
(58) Field of Classification Search .................. 60/612, 60/602, 321–323, 280; 123/562, 456; F02B 37/00, F02B 37/02, 37/04, 37/12, 37/18; F01N 7/10
See application file for complete search history.

(56) References Cited

U.S. PATENT DOCUMENTS

| 3,768,248 | A | * | 10/1973 | Grgurich et al. ............... 60/323 |
| 4,452,208 | A | | 6/1984 | Merlini et al. ............... 123/481 |
| 4,514,986 | A | * | 5/1985 | Benson ......................... 60/323 |
| 4,644,916 | A | * | 2/1987 | Kitagawa .................. 123/192.2 |
| 5,692,375 | A | * | 12/1997 | Novak et al. ................... 60/323 |
| 5,934,070 | A | | 8/1999 | Lagelstorfer ................. 60/232 |
| 6,000,380 | A | * | 12/1999 | Weisbarth ................... 123/456 |
| 6,185,938 | B1 | * | 2/2001 | Zander et al. ................. 60/280 |

(Continued)

FOREIGN PATENT DOCUMENTS

DE    2 034 312    1/1972

(Continued)

OTHER PUBLICATIONS

A certified English Translation copy of JP 62-189328 A.*

*Primary Examiner*—Thai Ba Trieu
(74) *Attorney, Agent, or Firm*—Klaus J. Bach

(57) ABSTRACT

In a supercharged internal combustion engine having a plurality of cylinders which are arranged in at least one cylinder bank, preferably a V-type engine with an exhaust gas turbocharger including a compressor, which is arranged in an intake line of the internal combustion engine and a turbine which is arranged in an exhaust gas collection line, the exhaust gas of a plurality of cylinders of the cylinder bank is combined in an exhaust gas collection line, while at least one cylinder of a cylinder bank has a separate exhaust gas line which bypasses the exhaust gas turbocharger and joins the exhaust gas line downstream of the turbine.

2 Claims, 2 Drawing Sheets

U.S. PATENT DOCUMENTS 6,508,223 B2 * 1/2003 Laimbeck et al. ........ 123/195 P
2009/0099755 A1 * 4/2009 Harbert ..................... 701/103

FOREIGN PATENT DOCUMENTS

| DE | 33 12 093 | 10/1984 |
| --- | --- | --- |
| DE | 38 24 346 | 12/1989 |
| DE | 697 23 307 | 11/1999 |
| DE | 698 14 660 | 5/2003 |
| DE | 102 17 225 | 11/2003 |
| EP | 1 083 318 | 8/2000 |
| EP | 1 589 202 | 10/2005 |
| GB | 2 143 580 | 2/1985 |
| JP | 61 207826 | 9/1986 |
| JP | 62189328 A * | 8/1987 |
| JP | 63 055326 | 3/1988 |
| JP | 05 071356 | 3/1993 |
| JP | 05 141256 | 6/1993 |
| JP | 2000 064868 | 2/2000 |
| JP | 2005-291045 | 10/2005 |

* cited by examiner

SUPERCHARGED INTERNAL COMBUSTION ENGINE

This is a Continuation-In-Part Application of pending International Patent Application PCT/EP2005/011914 filed Nov. 8, 2005 and claiming the priority of German Patent Application 10 2004 054 726.2 filed Nov. 12, 2004.

BACKGROUND OF THE INVENTION

The invention relates to a supercharged internal combustion engine having a plurality of cylinders which are arranged in at least one cylinder bank with an air intake line and an exhaust gas collection line and an exhaust gas turbocharger including a turbine driven by the exhaust gas and a charger rotating with the turbine for pressurizing the air supplied to the air intake line.

DE 102 17 225 A1 discloses a supercharged multiple-cylinder V-type internal combustion engine, in which six cylinders are combined in each cylinder bank, and a separate exhaust gas turbocharger is provided for each cylinder bank.

In particular in internal combustion engines having a large capacity, the exhaust-gas turbocharger has to have very large dimensions on account of the great exhaust gas mass flows. Exhaust gas turbochargers of this type having great volumetric flows have the disadvantage, however, of a high exhaust gas back pressure which has a negative effect on the consumption and the emissions under full load, on account of the limited installation space and the size of the turbine which is usually not present. Secondly, the turbine has a great mass which considerably cools the exhaust gas after a cold start and leads as a result to delayed heating of the catalytic converter, which in turn leads to unfavorable exhaust gas emissions after the cold start.

Moreover, DE 38 24 346 A1 discloses an internal combustion engine having two cylinder banks, in which one cylinder bank is provided with an exhaust gas turbocharger, while the other cylinder bank operates as a naturally aspirated engine.

It is the object of the present invention to provide a supercharged internal combustion engine with a reduced exhaust gas back pressure and improved exhaust gas emissions.

SUMMARY OF THE INVENTION

In a supercharged internal combustion engine having a plurality of cylinders which are arranged in at least one cylinder bank, preferably a V-type engine with an exhaust gas turbocharger including a compressor, which is arranged in an intake line of the internal combustion engine and a turbine which is arranged in an exhaust gas collection line, the exhaust gas of a plurality of cylinders of the cylinder bank is combined in an exhaust gas collection line, while at least one cylinder of a cylinder bank has a separate exhaust gas line which bypasses the exhaust gas turbocharger and joins the exhaust gas line downstream of the turbine.

As a reduced exhaust gas mass is therefore present at the turbine, the latter can be of smaller, with the result that both, the required installation space and the costs, are reduced. Although this also leads to a lower temperature after the turbine during a cold start, additional hot exhaust gas is conducted into the exhaust gas collection line downstream of the turbine, with the result that afterburning of the hydrocarbons which are contained in the exhaust gas already occurs directly in front of the catalytic converter in the first seconds after starting the internal combustion engine. As a result of this additional introduction of heat ahead of the catalytic converter, the reduced exhaust gas temperature ahead of the turbine is more than compensated for, with the result that, overall, the catalytic converter is more rapidly heated and, associated with this, the raw emissions ahead of the catalytic converter and the exhaust emissions after the catalytic converter are reduced.

In particular in V-type eight-cylinder engines with the special ignition sequence 1-5-4-2-6-3-7-8, a subsequent ignition with a 90° offset occurs on each cylinder bank. As a result, the gas exchange is detrimentally affected at higher load and higher rotational speeds. In a refinement of the invention, in each case the exhaust gas from one cylinder of the 90° offset of each cylinder bank (4 and 8) is conducted past the turbine in a bypass line. As a result, the engine rotational speed range which can be used with the exhaust gas turbocharger is considerably extended. The consumption and the emissions, in particular under full load, are also reduced by over 10% in comparison with conventional arrangements, as a result of a greater lambda value (lower enrichment of the mixture of all cylinders, but in particular in the case of cylinders 4 and 8).

In a further refinement of the invention, the exhaust gas collection line comprises a first common exhaust gas manifold for all the cylinders which are combined in the exhaust gas collection line, and a housing, which is integrated into the exhaust gas manifold, for the turbine of the exhaust gas turbocharger. Furthermore, the separate exhaust gas line has a second manifold for the at least one cylinder of the cylinder bank, and a T-shaped connection piece for the exhaust gas collection line. This arrangement is less susceptible to stress fractures.

In a further refinement of the invention, for simplified assembly, the two manifolds have in each case at least one flange for connection of the exhaust gas collection line to the separate exhaust gas line.

The invention will become more readily apparent from the following description of a preferred embodiment thereof with reference to the accompanying drawings.

DESCRIPTION OF A PARTICULAR EMBODIMENT

Figure 1:
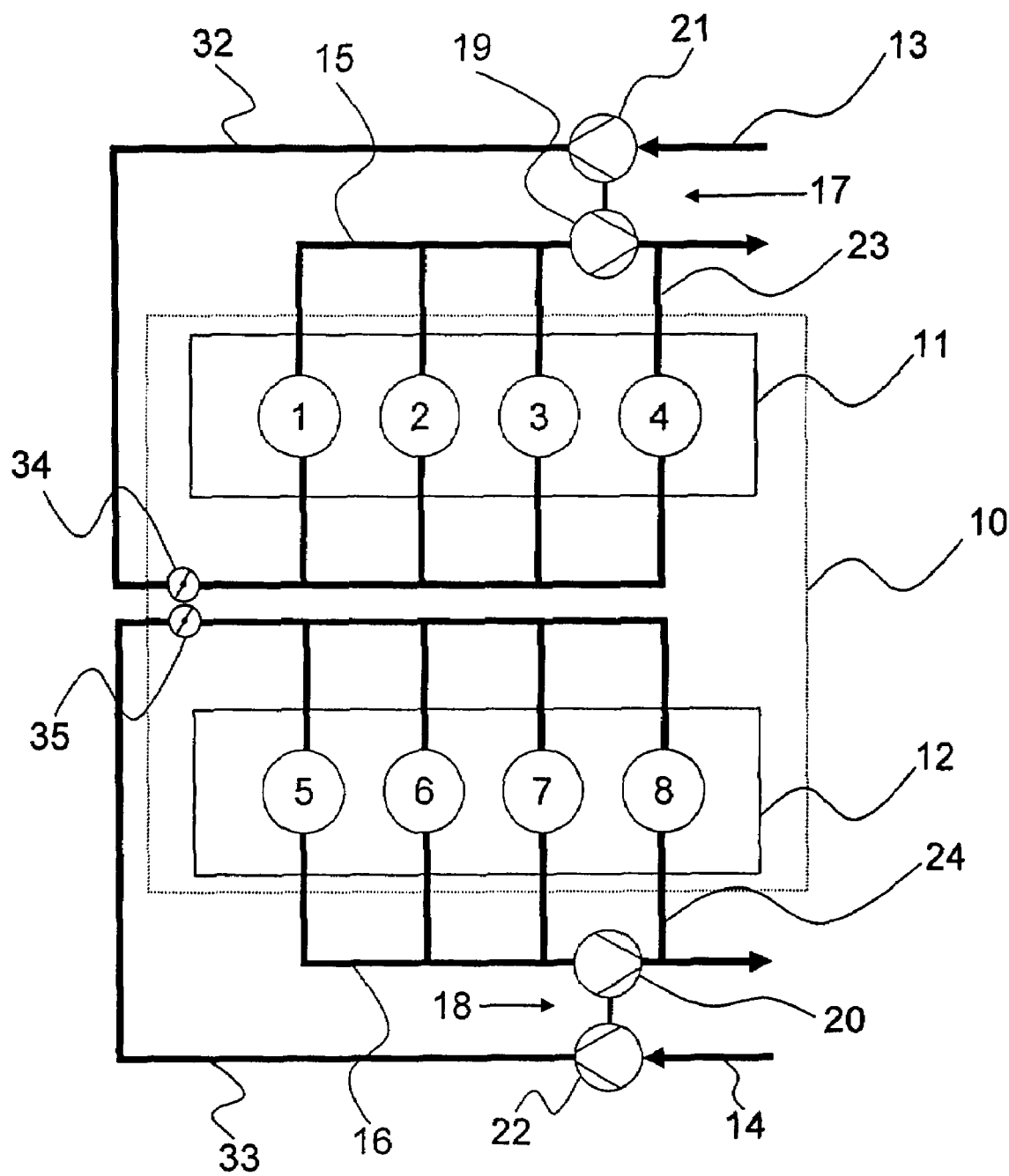
FIG. 1 shows schematically a supercharged V-type internal combustion engine having eight cylinders with two cylinder banks and for each cylinder bank one exhaust gas collection line and one separate exhaust gas line.

The internal combustion engine which is labeled overall with 10 has two cylinder banks 11, 12 which are arranged opposite one another and have each four cylinders 1 to 4 and 5 to 8. In each case one intake line 13, 14 for feeding combustion air to the compressor 21, 22 is provided for the cylinder bank 11, 12. Downstream of the compressors 21, 22, pressure lines 32, 33 conduct the compressed combustion air separately to the cylinders 1 to 4 of the cylinder bank 11 and to the cylinders 5 to 8 of the cylinder bank 12 of the internal combustion engine 10, via in each case one throttle valve 34, 35. As an alternative (not shown), the pressure lines 32, 33 can also lead the combustion air jointly through a single throttle valve into a common intake manifold for the cylinder banks 11 and 12. Furthermore, one exhaust gas collection line 15, 16 for guiding exhaust gases away from the cylinders 1 to 3 and 5 to 7 is provided for each cylinder bank 11, 12. In addition, each cylinder bank 11, 12 is assigned an exhaust gas turbocharger 17, 18, in each case the turbine 19, 20 being arranged in the exhaust gas collection line 15, 16 and the compressor 21, 22 being arranged in the intake line 13, 14 or a common intake line.

Separate exhaust gas lines 23, 24 which are combined in each case with the exhaust gas collection line 15, 16 downstream of the turbine 19, 20 are provided for the cylinders 4 and 8.

In the case of turbocharged internal combustion engines having a plurality of cylinders which are combined in one cylinder bank ahead of the turbocharger, disruptions can occur in the gas exchange of in each case 2 cylinders having a 90° spacing per bank in the case when load and rotational speed increase in ignition sequences, in which ignitions which follow one another are offset in each case only by 90°. This problem occurs, in particular, in v-type internal combustion engines having eight cylinders and, on account of the special ignition sequence 1-5-4-2-6-3-7-8, the gas exchange of the cylinders 4 and 2 and of the cylinders 7 and 8 of each cylinder bank being impaired herein.

In order to eliminate this impairment, according to the invention, only three of the cylinders, that is, the cylinders 1 to 3, and 5 to 7 are combined into an exhaust gas connection line 15, 16, while the disruption of the charge exchange as a result of the 90° ignition sequence is eliminated with the aid of the separate exhaust gas routing of the cylinders 4, 8. Here, the exhaust gas of the cylinders 4 and 8 is routed via a separate exhaust gas line 23, 24 past the exhaust gas turbocharger 17, 18. This ensures that the exhaust gas flows of the cylinders 4, 8 and the exhaust gas flows of the respective other cylinders 1 to 3, 5 to 7 do not influence each other. As the exhaust gas turbocharger 17, 18 is then charged only with 75% of the exhaust gas amount (compared with conventional arrangements) and the charge exchange work via the cylinders becomes smaller so that also, the turbine 19, 20 can be smaller.

As a result of these measures, the engine rotational speed range which can be used for supercharging can be considerably extended. Moreover, at relatively high engine loads, the fuel consumption and the emissions are reduced with a simultaneous power increase. Furthermore, as a result of an improved equal distribution of the eight cylinder pressures, the peak pressure over all 8 cylinders becomes smaller despite the higher power yield and, as a result, the operating reliability of the internal combustion engine overall is increased. The smaller turbine of the exhaust gas turbocharger requires less installation space and also costs are reduced. Moreover, warming up and, associated with this, also the emissions behavior of the internal combustion engine during cold starting are likewise improved.

Although a lower temperature after the turbine 19, 20 results during the cold start from the reduced exhaust gas amount which is fed to the turbine 19, 20, additional hot exhaust gas is guided directly into the exhaust gas system downstream of the turbine 19, 20, with the result that afterburning of the hydrocarbons which are contained in the exhaust gas already occurs directly in front of the catalytic converter (not shown) in the first seconds after starting the internal combustion engine 10. As a result of this additional introduction of heat ahead of the catalytic converter, the reduced exhaust gas temperature ahead of the turbine 19, 20 is more than compensated for, with the result that overall more rapid heating of the catalytic converter and, associated with this, a reduction in the raw emissions ahead of the catalytic converter and the exhaust emissions overall after the catalytic converter occur. In the spark ignition engines, a two-stage thermoreactor can therefore be realized with a first stage in the exhaust gas collection line 15, 16 ahead of the turbine 19, 20 and a second stage downstream of the combination of the exhaust gas collection line 15, 16 and the separate exhaust gas line 23, 24.

A further advantage of the arrangement resides in the fact that the exhaust gas back pressure is reduced and therefore the necessary boost pressure can also be designed to be lower.

Figure 2:
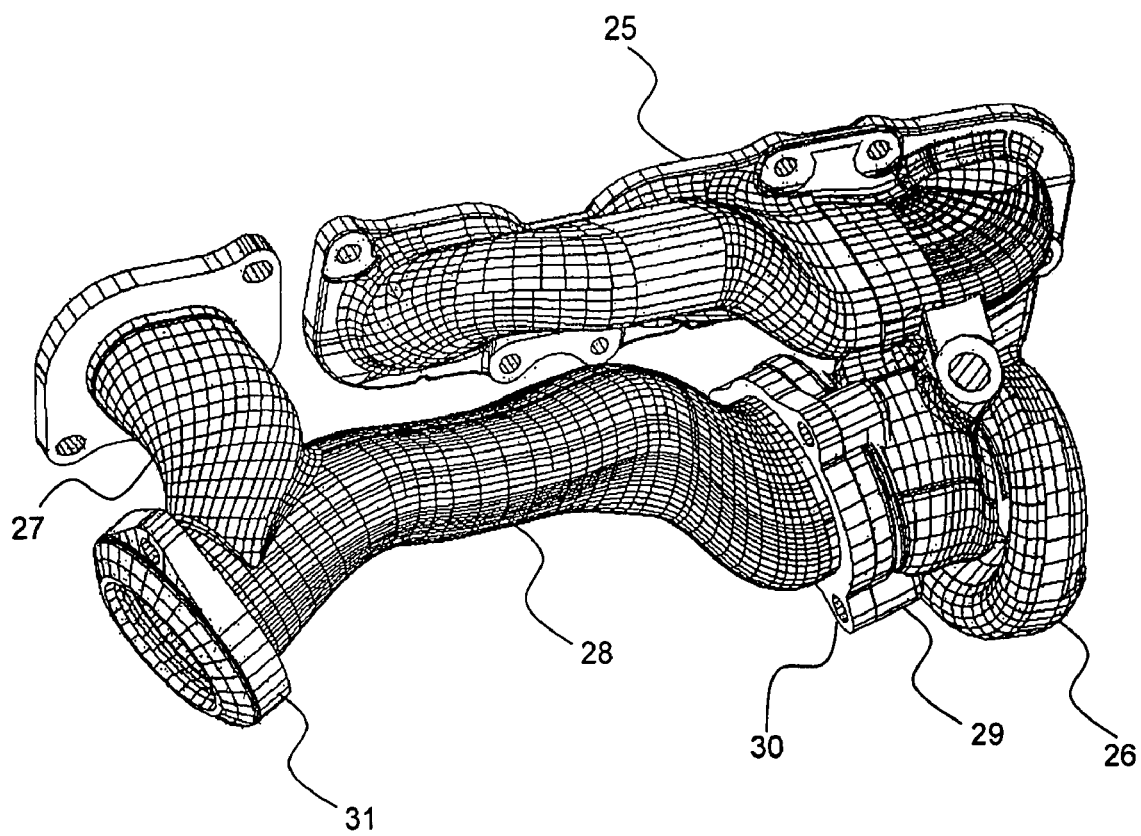
FIG. 2 is a three-dimensional illustration of an exhaust gas collection line and a separate exhaust gas line for a cylinder bank having four cylinders.

FIG. 2 shows a three-dimensional illustration of the exhaust gas system of one cylinder bank. The exhaust gas system has a first common exhaust gas manifold 25 for the cylinders 1-3, 5-7 which are combined in the exhaust gas collection line 15, 16 and a housing 26 for the exhaust gas turbocharger 17, 18, which is integrated into the exhaust gas manifold 25. Furthermore, the exhaust gas system has a second exhaust gas manifold 27 for a single cylinder 4, 8, and a T-shaped connection piece 28 for connection to the exhaust gas collection line 15, 16. In the exemplary embodiment which is shown, the second exhaust gas manifold 27 and the T-shaped connection piece 28 are one-piece components. As an alternative, a different, releasable or fixed connection can be provided between the second manifold 27 and the connection piece 28.

The connection of the two manifolds 25, 27 to one another, and to the internal combustion engine 10 and the catalytic converter (not shown), preferably likewise takes place via flange connections. For this purpose, a first flange 29 is provided on the first manifold 25 downstream of the housing 26, and a second, corresponding flange 30 is provided on the T-shaped connection piece 28. Moreover, the T-shaped connection piece 28 has a further flange 31 at the downstream end for connection to the catalytic converter (not shown) or an exhaust gas system. Finally, the first and the second exhaust gas manifolds 25, 27 can be connected to the cylinder bank 11, 12 of the internal combustion engine 10 via flange connections.

The use of two separate exhaust gas manifolds 25, 27 per cylinder bank 11, 12 has the advantage that the arrangement is less susceptible to stress fractures.

In the exemplary embodiment, the invention is explained using a V-type internal combustion engine 10 having eight cylinders 1-8, but can also be used for internal combustion engines 10 having a different design and/or a different cylinder number per cylinder bank 11, 12. Which of the cylinders 1-8 is connected via a separate exhaust gas line 23, 24 to the exhaust gas collection line 13, 14 also depends, in particular, on the respective ignition sequence. In the embodiment which is shown, the last two cylinders 4, 8 of each cylinder bank 11, 12 are critical with regard to the gas exchange and are therefore provided with separate exhaust gas lines 23, 24. In this case, the result is a particularly simple arrangement. However, if required, any other cylinder 1-8 can also be provided with a separate exhaust gas line 23, 24.

In a further exemplary embodiment (not shown), two or more critical cylinders 1-8 per cylinder bank 11, 12 can also bypass the exhaust gas turbocharger 17, 18. For this purpose in each case one separate exhaust gas line 23, 24 may be provided per critical cylinder 1-8 or else a separate exhaust gas line 23, 24 for all critical cylinders 1-8 jointly may be provided.

What is claimed is:

1. A supercharged V8 internal combustion engine (10) having two cylinder banks (11, 12) with four cylinders (1-4, 5-8) arranged in each of its two cylinder banks (11, 12), the V8 engine having an ignition sequence of 1-5-4-2-6-3-7-8 with a 90° ignition offset between cylinders so that in each cylinder bank, two cylinders (2 and 4 in bank 11 and 7 and 8 in bank 12) have the 90° ignition spacing, an intake line (13, 14) for feeding combustion air to the two cylinder banks. (11, 12) of the internal combustion engine (10), two exhaust gas collection lines (15, 16) for conducting exhaust gases away from the cylinders (1-8) of the cylinder banks (11, 12), an exhaust gas turbocharger (17, 18) including a turbine (19, 20) arranged in each exhaust gas collection line (15, 16) and a compressor (21, 22) arranged in each intake line (13, 14, one of the two cylinders with 90° ignition spacing in each bank (11, 12) having a separate exhaust gas line (23, 24) extending from the respective one cylinder (4 and 8) of the cylinder bank (11, 12) and joining the exhaust gas collection line (15, 16) downstream of the turbine (19, 20) of the exhaust gas turbocharger (17, 18), and the other cylinders (1, 2, 3, 5, 6, 7) being connected to the exhaust gas collection line (15, 16) upstream of the respective exhaust gas turbine (19, 20), each of the exhaust gas collection lines (15, 16) comprising a first common exhaust gas manifold (25) for all the cylinders (1-3, 5-7) which are combined in the respective exhaust gas collection line (15, 16), and an exhaust gas turbocharger housing (26), which is integrated into the exhaust gas manifold (25), the separate exhaust gas lines (23, 24) having second exhaust gas manifolds (27) for the cylinders (4, 8) of the two cylinder banks (11, 12), and a connection piece (28) for each of the exhaust gas collection lines (15, 16), each of the exhaust gas collection lines (15, 16) having a first flange (29) downstream of the turbine (19, 20), the second exhaust gas manifold (27) and the connection piece (28) at each bank (11, 12) being single piece components, and the connection piece (28) having a second flange (30) for connection to the first flange (29).

2. The supercharged internal combustion engine as claimed in claim 1, wherein in each case the last cylinder (4, 8) of each cylinder bank (11, 12) has a separate exhaust gas line (23, 24).

* * * * *